United States Patent
Feng

(10) Patent No.: US 7,321,593 B1
(45) Date of Patent: Jan. 22, 2008

(54) FIBRE CHANNEL SERDES WITH ELASTIC TRANSMITTER FIFO

(75) Inventor: Hong Wei Feng, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 986 days.

(21) Appl. No.: 10/621,297

(22) Filed: Jul. 17, 2003

(51) Int. Cl.
*H04L 12/28* (2006.01)

(52) U.S. Cl. .................................. 370/412; 370/419

(58) Field of Classification Search .................. None
See application file for complete search history.

(56) References Cited

U.S. PATENT DOCUMENTS

| | | | |
|---|---|---|---|
| 5,757,297 | A | 5/1998 | Ferraiolo et al. |
| 6,064,679 | A | 5/2000 | Hashemi et al. |
| 6,157,652 | A | 12/2000 | Henson et al. |
| 6,295,281 | B1 | 9/2001 | Itkowsky et al. |
| 6,542,096 | B2 | 4/2003 | Chan et al. |
| 7,191,371 | B2 * | 3/2007 | Hsu et al. .................. 714/717 |
| 7,206,323 | B1 * | 4/2007 | Trikutam et al. ........... 370/466 |
| 2003/0113031 | A1 * | 6/2003 | Wal ............................ 382/260 |
| 2003/0189903 | A1 * | 10/2003 | Hsu et al. ................... 370/241 |
| 2006/0092969 | A1 * | 5/2006 | Susnow et al. ............. 370/465 |
| 2006/0218597 | A1 * | 9/2006 | FitzGerald .................. 725/86 |

FOREIGN PATENT DOCUMENTS

WO    WO 02/077833 A1    10/2002

* cited by examiner

*Primary Examiner*—Andrew C. Lee

(57) ABSTRACT

A data transfer system having a method and computer program therefor comprises a buffer adapted to receive parallel data according to a first clock signal, and to transmit the parallel data according to a second clock signal, wherein the buffer comprises a plurality of storage cells adapted to store the parallel data received by the buffer; a buffer controller adapted to cause the buffer to transmit an additional predetermined amount of the parallel data when a number of the storage cells storing the parallel data received by the buffer but not yet transmitted by the buffer is less than or equal to a first threshold; wherein the buffer controller is further adapted to cause the buffer to delete a predetermined amount of the parallel data when a number of the storage cells storing the parallel data received by the buffer but not yet transmitted by the buffer is greater than or equal to a second threshold; and a serializer adapted to convert the parallel data transmitted by the buffer to serial data, and to transmit the serial data according to the second clock signal; wherein the first and second clock signals are independent.

78 Claims, 5 Drawing Sheets

FIBRE CHANNEL SERDES WITH ELASTIC TRANSMITTER FIFO

BACKGROUND

The present invention relates generally to serializer/deserializer (SERDES) devices. More particularly, the present invention relates to a transmitter having an elastic first-in first-out buffer in a fibre channel SERDES transmitter.

SERDES devices are commonly used where systems that internally handle multi-bit data words over parallel busses communicate with each other over a communications channel using serial bitstreams. Each SERDES device comprises a serializer that converts the data words to a serial bitstream before transmitting the bitstream over the channel, and a deserializer that converts a serial bitstream received from the channel to a plurality of data words.

One common application of SERDES devices is in storage area networks (SAN). FIG. 1 shows a SAN system 100 that comprises a SAN 102 connected to a local area network (LAN) 104 by a server 106. Computers and other network devices within LAN 104 can exchange data with storage devices within SAN 102 using server 106. A primary advantage of such a SAN system is that traffic between storage devices within SAN 102, such as to back up data from one storage device to another, does not burden LAN 104.

One common way to implement SAN 102 is according to the American National Standards Institute (ANSI) Fibre Channel standards, which define a high-performance data communications technology that supports very fast data rates (over 2 Gbps). FIG. 2 shows detail of a Fibre Channel implementation of SAN 102. SAN 102 comprises a plurality of SAN devices 206A through 206N that are connected to each other, and to server 106, by a fibre channel switch 204 over high-speed links such as multimode or single mode fiber optic cable.

FIG. 3 shows a SAN device 206 according to a conventional implementation. SAN device 206 comprises a host 302, such as a storage device, connected by a fibre channel interface that comprises a SERDES 304 to fibre channel switch 204.

SERDES 304 comprises a serialization unit 306 and a deserialization unit 308. Serialization unit 306 receives n-bit words of digital data over a parallel XMIT bus and a transmit clock XMIT_CLK from host 302, and transmits a serial bitstream of the digital data to fiber channel switch 204. Deserialization unit 308 receives a serial bitstream of digital data from fibre channel switch 204, and transmits n-bit words of the digital data over a parallel RECV bus to host 302.

Serialization unit 306 comprises a first-in first-out (FIFO) buffer 310, a serializer 312, a transmitter 314, and a phase-locked loop (PLL) 316. FIFO buffer 310 receives words of digital data from host 302 according to clock signal XMIT_CLK, and transmits the words of digital data to serializer 312, also according to clock signal XMIT_CLK. Serializer 312 converts the words of digital data to a serial bitstream. Transmitter 314 transmits the serial bitstream to fibre channel switch 204 according to a clock signal generated by PLL 316 according to clock signal XMIT_CLK.

Deserialization unit 308 comprises a receiver 318, a deserializer 320, and a FIFO buffer 322. Receiver 318 receives a serial bitstream of digital data from fibre channel switch 204. Deserializer 320 converts the serial bitstream to n-bit words of the digital data which are buffered by FIFO buffer 322 before transmission to host 302.

A significant disadvantage of SERDES 304 is that, while the rate of transmission of the serial bitstream by transmitter 314 is required by the Fibre Channel standards to have clock jitter less than 100 ppm, the clock signal XMIT_CLK that drives transmitter 314 can have significantly more jitter. While this clock accuracy is adequate for data rates up to 2 Gbps, it is insufficient to support higher data rates.

SUMMARY

In general, in one aspect, the invention features a data transfer system comprising a channel; a transmission unit comprising a first host adapted to transmit parallel data and a first clock signal, and a serialization unit comprising a buffer adapted to receive the parallel data from the serialization unit according to the first clock signal, and to transmit the parallel data according to a second clock signal, wherein the buffer comprises a plurality of storage cells adapted to store the parallel data received by the buffer, a buffer controller adapted to cause the buffer to transmit an additional predetermined amount of the parallel data when a number of the storage cells storing the parallel data received by the buffer but not yet transmitted by the buffer is less than or equal to a first threshold; wherein the buffer controller is further adapted to cause the buffer to delete a predetermined amount of the parallel data when a number of the storage cells storing the parallel data received by the buffer but not yet transmitted by the buffer is greater than or equal to a second threshold. and a serializer adapted to convert the parallel data transmitted by the buffer to serial data, and to transmit the serial data to the channel according to the second clock signal, wherein the first and second clock signals are independent; and a reception unit comprising a deserialization unit comprising a deserializer adapted to receive the serial data from the channel, and to convert the serial data to the parallel data, and a second host adapted to receive the parallel data from the deserialization unit.

Particular implementations can include one or more of the following features. The parallel data comprises a plurality of frames and a plurality of fill words; and the predetermined additional amount of the parallel data comprises one of the fill words. The parallel data comprises a plurality of frames and a plurality of fill words; and the predetermined amount of the parallel data that is deleted by the buffer comprises one of the fill words. The buffer comprises a plurality of storage cells adapted to store the parallel data received by the buffer; the total number of the storage cells in the buffer is 11; the first threshold is 3; and the second threshold is 6 or 8. The buffer comprises a plurality of storage cells adapted to store the parallel data received by the buffer; the total number of the storage cells in the buffer is 11; the first threshold is 3; and the second threshold is 10. The buffer is a first-in first-out (FIFO) buffer. The channel comprises a fibre channel. The serializer is further adapted to transmit the serial data to the channel at a rate greater than or equal to 4 Gbps. A storage area network (SAN) comprises the data transfer system.

In general, in one aspect, the invention features a data transceiver comprising a host adapted to receive first parallel data, and to transmit second parallel data and a first clock signal; and a serializer/deserializer (SERDES) comprising a deserialization unit comprising a deserializer adapted to receive first serial data from a channel, and to convert the first serial data to the first parallel data, and a serialization unit comprising a buffer adapted to receive the second parallel data according to the first clock signal, and to transmit the second parallel data according to a second clock signal, wherein the buffer comprises a plurality of storage cells adapted to store the second parallel data received by the buffer, a buffer controller adapted to cause the buffer to transmit an additional predetermined amount of the second parallel data when a number of the storage cells storing the second parallel data received by the buffer but not yet transmitted by the buffer is less than or equal to a first threshold; wherein the buffer controller is further adapted to cause the buffer to delete a predetermined amount of the second parallel data when a number of the storage cells storing the second parallel data received by the buffer but not yet transmitted by the buffer is greater than or equal to a second threshold, and a serializer adapted to convert the second parallel data transmitted by the buffer to second serial data, and to transmit the second serial data to the channel according to the second clock signal, wherein the first and second clock signals are independent.

Particular implementations can include one or more of the following features. The second parallel data comprises a plurality of frames and a plurality of fill words; and the additional predetermined amount of the second parallel data comprises one of the fill words. The second parallel data comprises a plurality of frames and a plurality of fill words; and the predetermined amount of the second parallel data that is deleted by the buffer comprises one of the fill words. The buffer comprises a plurality of storage cells adapted to store the second parallel data received by the buffer; the total number of the storage cells in the buffer is 11; the first threshold is 3; and the second threshold is 6 or 8. The buffer comprises a plurality of storage cells adapted to store the second parallel data received by the buffer; the total number of the storage cells in the buffer is 11; the first threshold is 3; and the second threshold is 10. The buffer is a first-in first-out (FIFO) buffer. The channel comprises a fibre channel. The serializer is further adapted to transmit the serial data to the channel at a rate greater than or equal to 4 Gbps. A storage area network (SAN) comprises the data transceiver.

In general, in one aspect, the invention features a serializer/deserializer (SERDES) comprising a deserialization unit comprising a deserializer adapted to receive first serial data from a channel, and to convert the first serial data to first parallel data; and a serialization unit comprising a buffer adapted to receive second parallel data according to a first clock signal, and to transmit the second parallel data according to a second clock signal, wherein the buffer comprises a plurality of storage cells adapted to store the second parallel data received by the buffer, a buffer controller adapted to cause the buffer to transmit an additional predetermined amount of the second parallel data when a number of the storage cells storing the second parallel data received by the buffer but not yet transmitted by the buffer is less than or equal to a first threshold, wherein the buffer controller is further adapted to cause the buffer to delete a predetermined amount of the second words of the digital data when a number of the storage cells storing the second parallel digital data received by the buffer but not yet transmitted by the buffer is greater than or equal to a second threshold, and a serializer adapted to convert the second parallel data transmitted by the buffer to second serial data, and to transmit the second serial data to the channel according to the second clock signal; wherein the first and second clock signals are independent.

Particular implementations can include one or more of the following features. The second parallel data comprises a plurality of frames and a plurality of fill words; and the additional predetermined amount of the second parallel data comprises one of the fill words. The second parallel data comprises a plurality of frames and a plurality of fill words; and the predetermined amount of the second parallel data that is deleted by the buffer comprises one of the fill words. The buffer comprises a plurality of storage cells adapted to store the second parallel data received by the buffer; the total number of the storage cells in the buffer is 11; the first threshold is 3; and the second threshold is 6 or 8. The buffer comprises a plurality of storage cells adapted to store the second parallel data received by the buffer; the total number of the storage cells in the buffer is 11; the first threshold is 3; and the second threshold is 10. The buffer is a first-in first-out (FIFO) buffer. The channel comprises a fibre channel. The serializer is further adapted to transmit the serial data to the channel at a rate greater than or equal to 4 Gbps. A storage area network (SAN) comprises the SERDES.

In general, in one aspect, the invention features an apparatus comprising a buffer adapted to receive parallel data according to a first clock signal, and to transmit the parallel data according to a second clock signal, wherein the buffer comprises a plurality of storage cells adapted to store the parallel data received by the buffer; a buffer controller adapted to cause the buffer to transmit an additional predetermined amount of the parallel data when a number of the storage cells storing the parallel data received by the buffer but not yet transmitted by the buffer is less than or equal to a first threshold; wherein the buffer controller is further adapted to cause the buffer to delete a predetermined amount of the parallel data when a number of the storage cells storing the parallel data received by the buffer but not yet transmitted by the buffer is greater than or equal to a second threshold; and a serializer adapted to convert the parallel data transmitted by the buffer to serial data, and to transmit the serial data according to the second clock signal; wherein the first and second clock signals are independent.

Particular implementations can include one or more of the following features. The parallel data comprises a plurality of frames and a plurality of fill words; and the additional predetermined amount of the parallel data comprises one of the fill words. The parallel data comprises a plurality of frames and a plurality of fill words; and the predetermined amount of the parallel data that is deleted by the buffer comprises one of the fill words. The total number of the storage cells in the buffer is 11; the first threshold is 3; and the second threshold is 6 or 8. The total number of the storage cells in the buffer is 11; the first threshold is 3; and the second threshold is 10. The buffer is a first-in first-out (FIFO) buffer. The serializer transmits the serial data to a fibre channel. The serializer is further adapted to transmit the serial data to the channel at a rate greater than or equal to 4 Gbps. A storage area network (SAN) comprises the apparatus.

In general, in one aspect, the invention features a method and computer program The method comprises storing parallel data according to a first clock signal; retrieving the parallel data according to a second clock signal; converting the retrieved parallel data to serial data; transmitting the serial data according to the second clock signal; wherein the first and second clock signals are independent; transmitting an additional predetermined amount of the parallel data when a number of storage cells storing the parallel data stored but not yet retrieved is less than or equal to a first threshold; and deleting a predetermined amount of the parallel data when a number of the storage cells storing the parallel data stored but not yet retrieved is greater than or equal to a second threshold.

Particular implementations can include one or more of the following features. The parallel data comprises a plurality of frames and a plurality of fill words; and the additional predetermined amount of the parallel data comprises one of the fill words. The parallel data comprises a plurality of frames and a plurality of fill words; and the predetermined amount of the parallel data that is deleted comprises one of the fill words. The total number of the storage cells available to store the parallel data is 11; the first threshold is 3; and the second threshold is 6 or 8. The total number of the storage cells available to store the parallel data is 11; the first threshold is 3; and the second threshold is 10. The serial data is transmitted to a fibre channel. The serial data is transmitted at a rate greater than or equal to 4 Gbps.

The details of one or more implementations are set forth in the accompanying drawings and the description below. Other features will be apparent from the description and drawings, and from the claims.

Figure 1:
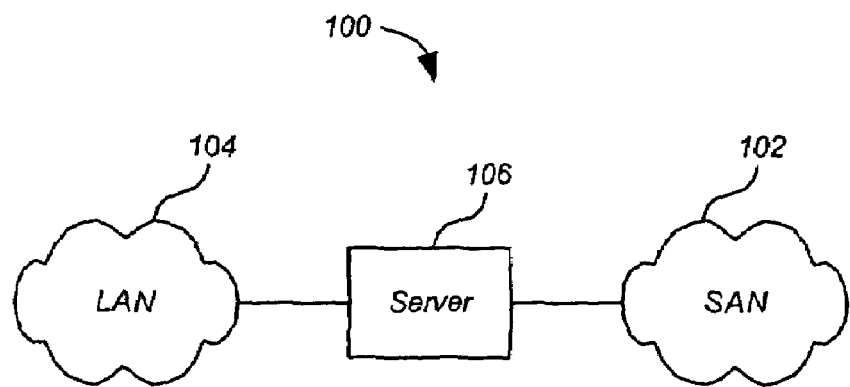
FIG. 1 shows a SAN system that comprises a SAN connected to a local area network (LAN) by a server.
Figure 2:
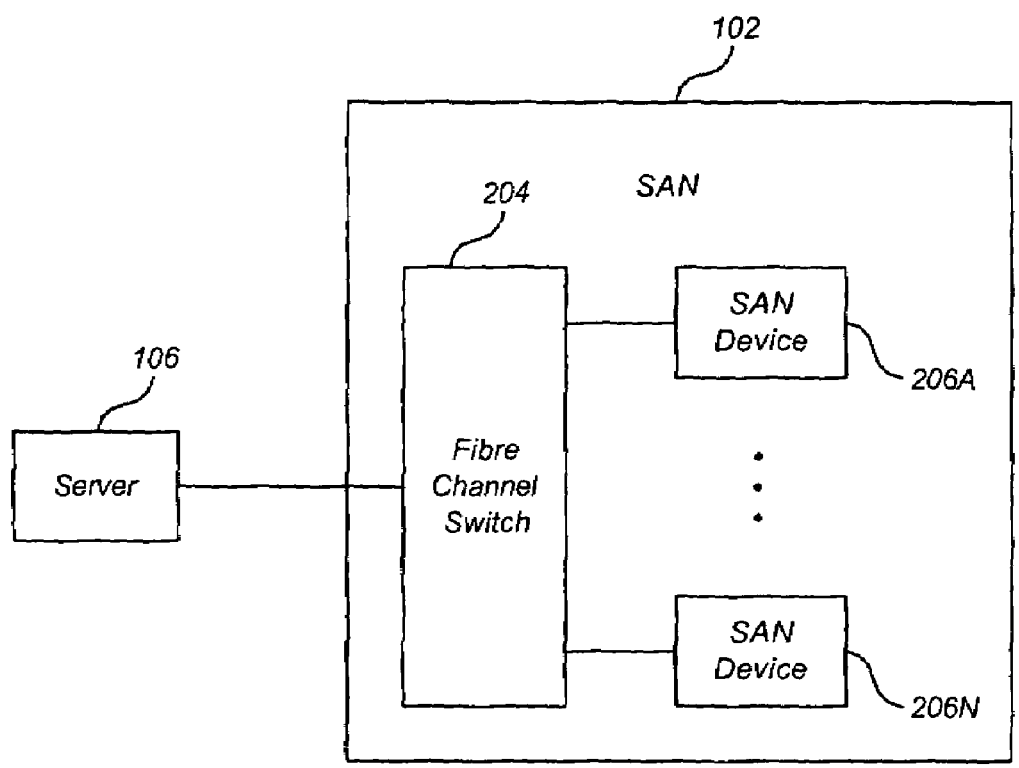
FIG. 2 shows detail of a Fibre Channel implementation of the SAN of FIG. 1.

The leading digit(s) of each reference numeral used in this specification indicates the number of the drawing in which the reference numeral first appears.

DETAILED DESCRIPTION

Figure 3:
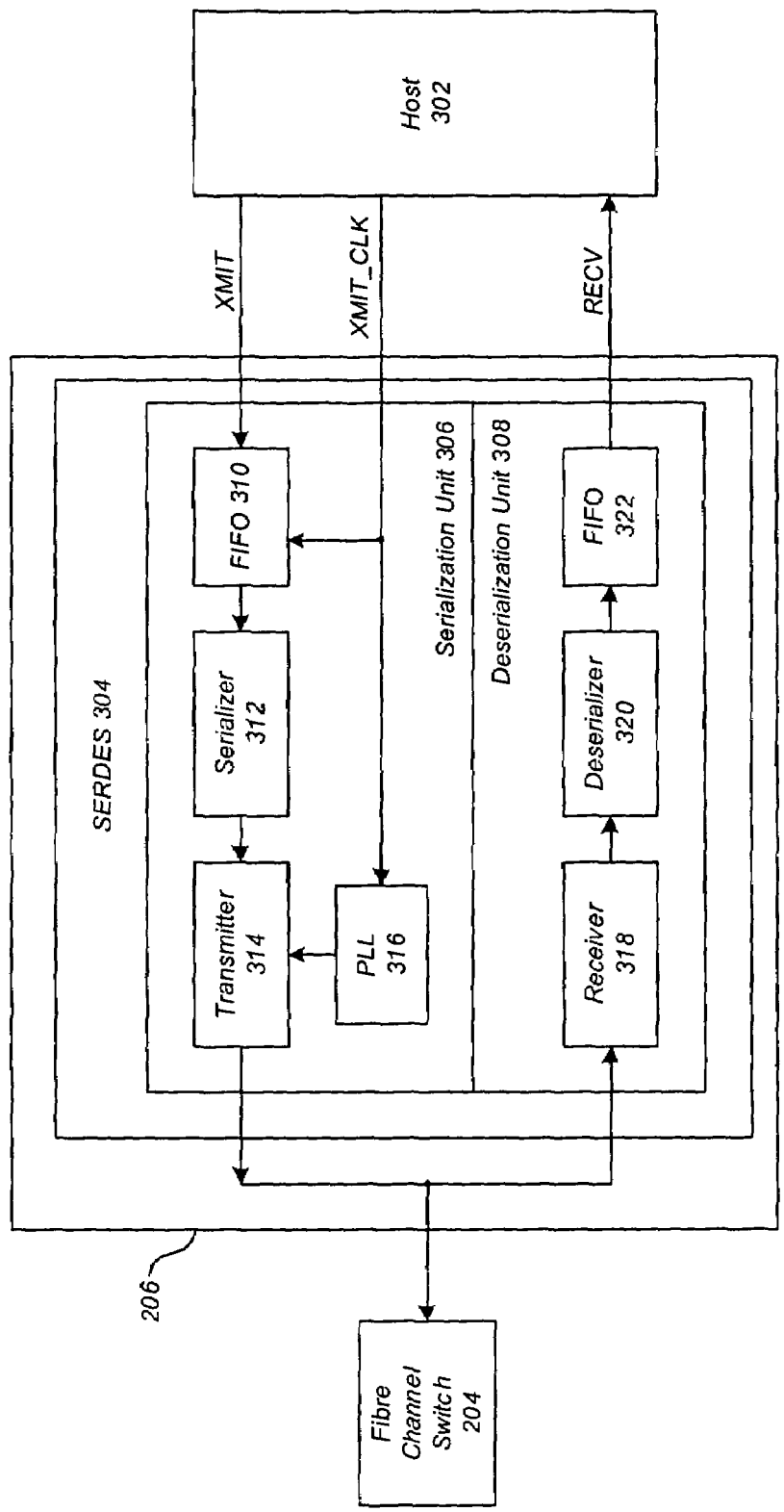
FIG. 3 shows a SAN device according to a conventional implementation.
Figure 4:
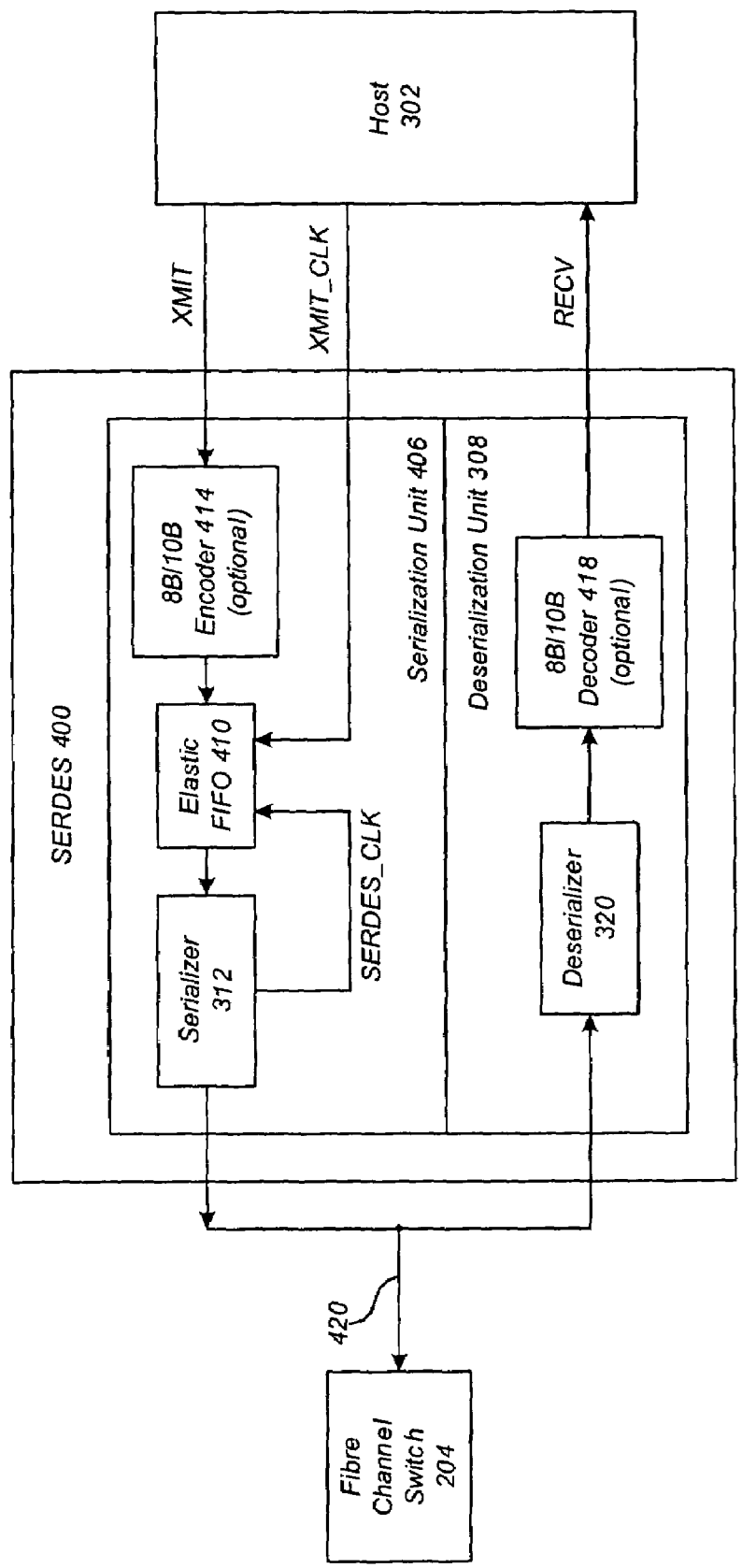
FIG. 4 shows a SERDES according to a preferred embodiment that can replace the SERDES of FIG. 3.

FIG. 4 shows a SERDES 400 according to a preferred embodiment that can replace SERDES 304 of FIG. 3. While embodiments of the present invention are described with reference to storage area networks and fibre channel transmission, other embodiments are not so confined, and can be implemented with different sorts of communication networks, communication standards, and communication channel media.

SERDES 400 comprises a serialization unit 406 and a deserialization unit 308. Serialization unit 406 receives n-bit words of digital data over parallel XMIT bus and transmit clock XMIT_CLK from host 302, and transmits a serial bitstream of the digital data to fiber channel switch 204 over a channel 420. Deserialization unit 308 receives a serial bitstream of digital data from fibre channel switch 204 over channel 420, and transmits n-bit words of the digital data over parallel RECV bus to host 302.

Serialization unit 306 comprises an elastic first-in first-out (FIFO) buffer 410, a serializer 312, and an optional 8B/10B encoder 414. Elastic FIFO buffer 310 receives words of digital data from host 302 according to clock signal XMIT_CLK, but transmits the words of digital data to serializer 312 according to another clock signal SERDES_CLK that is provided by serializer 312 according to a clock driver that can be implemented within SERDES 400 or elsewhere. Significantly, clock signal SERDES_CLK is accurate to within 100 ppm and is independent of clock signal XMIT_CLK.

In a preferred embodiment, optional 8B/10B encoder 414 encodes 32-bit words of digital data received from host 302 according to well-known techniques to produce 40-bit words of digital data, which are passed to serializer 312. Serializer 312 converts the words of digital data to a serial bitstream, and transmits the serial bitstream to fibre channel switch 204 according to clock signal SERDES_CLK.

Deserialization unit 308 operates as described above with reference to FIG. 3, except that in a preferred embodiment, an optional 8B/10B decoder 418 receives 40-bit words of digital data from fibre channel switch 204, and decodes the words according to well-known techniques to produce 32-bit words of digital data, which are passed to host 302.

Figure 5:
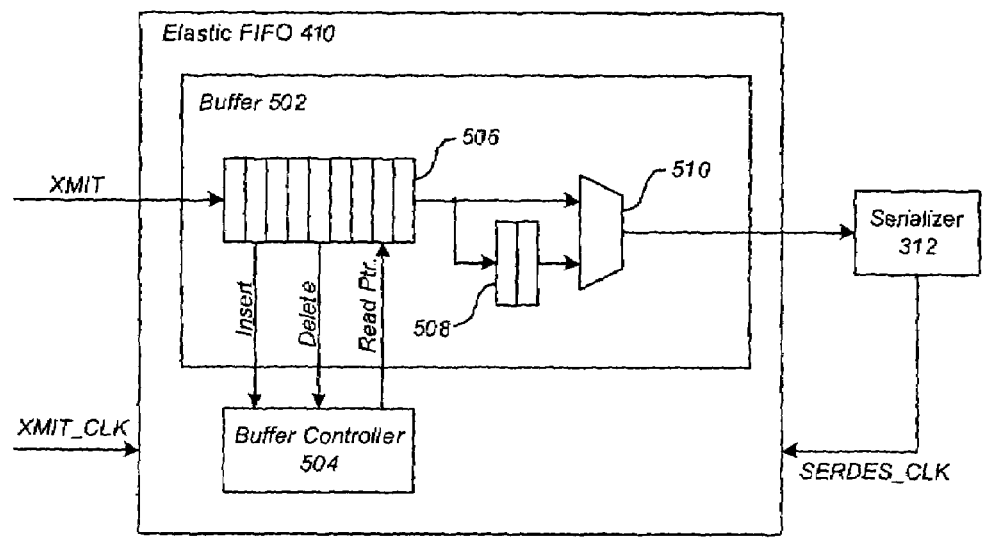
FIG. 5 shows detail of the elastic FIFO buffer of FIG. 4 according to a preferred embodiment.

FIG. 5 shows detail of elastic FIFO buffer 410 according to a preferred embodiment. Elastic FIFO buffer 410 comprises a buffer 502 and a buffer controller 504 that can be implemented with conventional logic devices, as a processor, or in other ways. Buffer 502 comprises a FIFO buffer 506, a two-stage delay unit 508, and a multiplexer 510. Buffer 502 receives words of digital data from host 302, and stores the words in a plurality of storage cells in FIFO buffer 506 according to the clock signal XMIT_CLK provided by host 302. Buffer 502 retrieves words of digital data stored in the storage cells according to clock signal SERDES_CLK, and transmits the retrieved digital words to serializer 312.

As the clock rates of clock signals XMIT_CLK and SERDES_CLK vary with respect to each other, the amount of valid data stored in buffer 502, which can be characterized by the number of storage cells storing words of the digital data that have been stored but not yet retrieved, can increase and decrease. Buffer controller 504 prevents overruns and underruns of buffer 502 by implementing deletion and insertion rules, as described in detail below.

Figure 6:
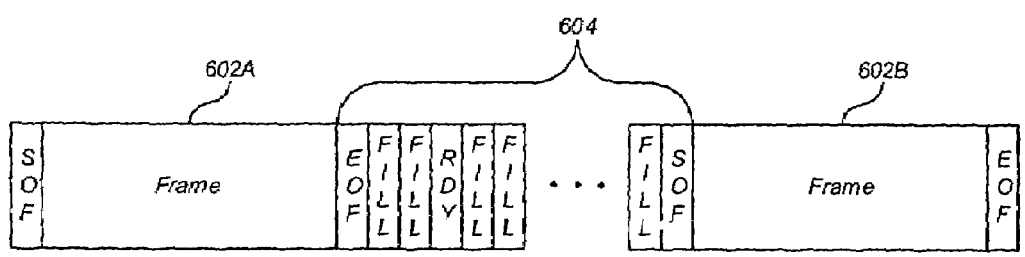
FIG. 6 shows a sample of the digital data handled by the SERDES of FIG. 4 according to the ANSI fibre channel standards.

FIG. 6 shows a sample of the digital data handled by SERDES 400 according to the ANSI fibre channel standards. The digital data comprises a plurality of 40-bit data words defining two frames 602A through 602B and an ordered set 604. Each frame 602 conveys a data payload. Each ordered set 604 can include frame delimiters (start-of-frame SOF and end-of-frame EOF), fill words (IDLE, ARB (X), ARB(F0) and ARB(FF)), non-fill words (RDY, VC_RDY, CLS, OPN, DHD, MRK, SYN) and primitive sequence (NOS, OLS, LR, LRR, LIP, LPB and LPE), as is well-known in the relevant arts.

Figure 7:
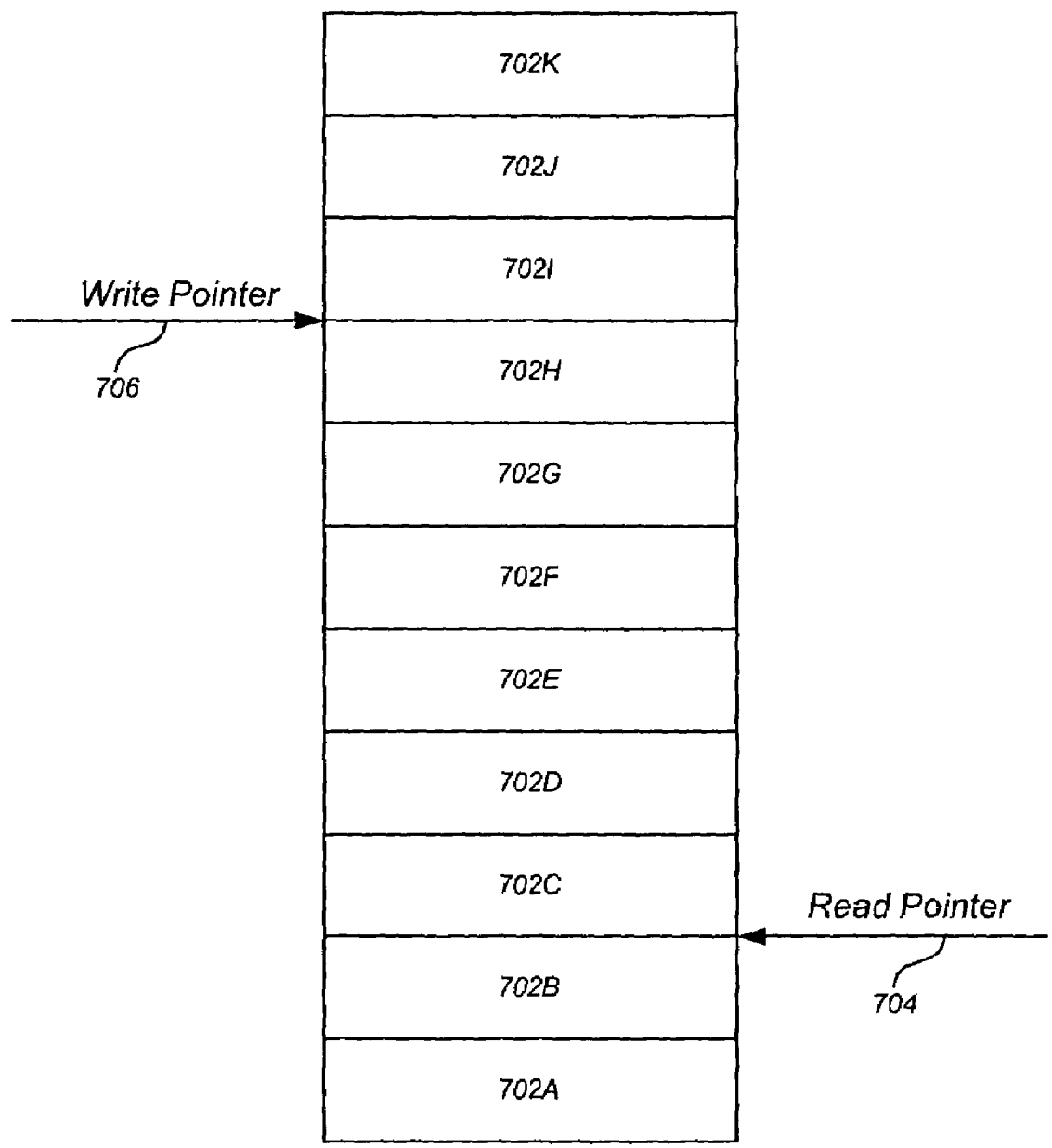
FIG. 7 shows the storage cells of the FIFO buffer of FIG. 5 according to a preferred embodiment.

FIG. 7 shows the storage cells 702 of FIFO buffer 506 according to a preferred embodiment. In one embodiment, FIFO buffer 506 has 11 storage cells 702A through 702K that are each 20 bits wide. Therefore a 40-bit digital word requires 2 storage cells 702.

FIG. 7 also shows an example location of a read pointer 704 and a write pointer 706. During each cycle of clock signal XMIT_CLK, buffer 502 receives and stores one 32-bit digital word in the storage cells 702 indicated by write pointer 706. During each cycle of clock signal SERDES_CLK, buffer 502 retrieves and transmits one 32-bit digital word in the storage cells 702 indicated by read pointer 704.

The locations of read pointer 704 and write pointer 706 are controlled by buffer controller 504 to confine the number of storage cells 702 storing valid words of digital data to a predetermined range. In some embodiments, buffer controller 504 causes buffer 502 to transmit an additional one of the words of the digital data when the number of storage cells 702 storing valid words of digital data is less than or equal to a first threshold, and causes buffer 502 to delete one of the words of the digital data when the number of storage cells 702 storing valid words of the digital data is greater than or equal to a second threshold. Preferably the additional words of the digital data transmitted, and the words of the digital data that are deleted, are fill words, so that no data is lost. In one embodiment, the first threshold is 3 and the second threshold is 6 or 8. In another embodiment, the first threshold is 3 and the second threshold is 10. Of course, other thresholds can be used.

In a preferred embodiment, buffer controller 504 causes buffer 502 to transmit additional fill words, and to delete fill words, as described below. Normally buffer controller 504 advances read pointer 704 by one storage location (that is, by half of a 40-bit word) during each cycle of clock signal SERDES_CLK, and advances write pointer 706 by one storage location during each cycle of clock signal XMIT_CLK.

When FIFO 506 is nearly empty (that is, when the number of valid words of data in FIFO 506 is less than or equal to the first threshold), FIFO 506 asserts an "insertion request" signal. In response, buffer controller 504 causes buffer 502 to insert a fill word. To insert a fill word, buffer controller 504 waits until buffer 502 transmits a fill word, and then freezes read pointer 704 (that is, does not advance read pointer 704) for one cycle of clock signal SERDES_CLK. Buffer controller also asserts an "insert" signal, which causes multiplexer 510 to pass the fill word just transmitted, which is now available from two-stage delay unit 508, to serializer 312. This causes buffer 502 to transmit the fill word twice, thereby inserting a fill word.

When FIFO 506 is nearly full (that is, when the number of valid words of data in FIFO 506 is greater than or equal to the second threshold), FIFO 506 asserts a "deletion request" signal. In response, buffer controller 504 causes buffer 502 to delete a fill word. To delete a fill word, buffer controller 504 waits until read pointer 704 points to storage cells 702 containing three consecutive fill words, and then advances read pointer 704 by three storage locations instead of one. This causes buffer 502 to delete one fill word.

According to the American National Standards Institute (ANSI) Fibre Channel standards, primitive signals, such as R_RDY, OPN, CLS, etc. must be preceded and followed by a minimum of two fill words by the sending port. In addition, after transmission of a frame, the sending port must transmit at least six words (fill words or non-fill word) before starting transmission of the next frame. The above-described deletion scheme meets the Fibre Channel standards when the upper layer (Fibre channel Level 2) guarantees the minimum frame gap is greater than 7.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Please list any additional modifications or variations. Accordingly, other implementations are within the scope of the following claims.

What is claimed is:

1. A data transfer system comprising:
   a channel;
   a transmission unit comprising
      a first host adapted to transmit parallel data and a first clock signal, and
      a serialization unit comprising
         a buffer adapted to receive the parallel data from the serialization unit according to the first clock signal, and to transmit the parallel data according to a second clock signal, wherein the buffer comprises a plurality of storage cells adapted to store the parallel data received by the buffer,
         a buffer controller adapted to cause the buffer to transmit an additional predetermined amount of the parallel data when a number of the storage cells storing the parallel data received by the buffer but not yet transmitted by the buffer is less than or equal to a first threshold;
         wherein the buffer controller is further adapted to cause the buffer to delete a predetermined amount of the parallel data when a number of the storage cells storing the parallel data received by the buffer but not yet transmitted by the buffer is greater than or equal to a second threshold, and
         a serializer adapted to convert the parallel data transmitted by the buffer to serial data, and to transmit the serial data to the channel according to the second clock signal,
      wherein the first and second clock signals are independent; and
   a reception unit comprising
      a deserialization unit comprising
         a deserializer adapted to receive the serial data from the channel, and to convert the serial data to the parallel data, and
      a second host adapted to receive the parallel data from the deserialization unit.

2. The data transfer system of claim 1:
   wherein the parallel data comprises a plurality of frames and a plurality of fill words; and
   wherein the predetermined additional amount of the parallel data comprises one of the fill words.

3. The data transfer system of claim 1:
wherein the parallel data comprises a plurality of frames and a plurality of fill words; and
wherein the predetermined amount of the parallel data that is deleted by the buffer comprises one of the fill words.

4. The data transfer system of claim 1:
wherein the buffer comprises a plurality of storage cells adapted to store the parallel data received by the buffer;
wherein the total number of the storage cells in the buffer is 11;
wherein the first threshold is 3; and
wherein the second threshold is 6 or 8.

5. The data transfer system of claim 1:
wherein the buffer comprises a plurality of storage cells adapted to store the parallel data received by the buffer;
wherein the total number of the storage cells in the buffer is 11;
wherein the first threshold is 3; and
wherein the second threshold is 10.

6. The data transfer system of claim 1, wherein the buffer is a first-in first-out (FIFO) buffer.

7. The data transfer system of claim 1, wherein the channel comprises a fibre channel.

8. The data transfer system of claim 1, wherein the serializer is further adapted to transmit the serial data to the channel at a rate greater than or equal to 4 Gbps.

9. A storage area network (SAN) comprising the data transfer system of claim 1.

10. A data transfer system comprising:
channel means for transferring data;
transmission means for transmitting the data, the transmission means comprising
first host means for transmitting parallel data and a first clock signal, and
serialization means for serializing the data, the serialization means comprising
buffer means for receiving the parallel data from the serialization means according to the first clock signal, and for transmitting the parallel data according to a second clock signal, wherein the buffer means comprises a plurality of storage cell means for storing the words of the digital data received by the buffer means,
buffer controller means for causing the buffer means to transmit an additional predetermined amount of the parallel data when a number of the storage cell means storing the parallel data received by the buffer means but not yet transmitted by the buffer means is less than or equal to a first threshold;
wherein the buffer controller means causes the buffer means to delete a predetermined amount of the parallel data when a number of the storage cell means storing the parallel data received by the buffer means but not yet transmitted by the buffer means is greater than or equal to a second threshold,
serializer means for converting the parallel data transmitted by the buffer means to serial data, and to transmit the serial data to the channel means according to the second clock signal,
wherein the first and second clock signals are independent; and
reception means for receiving the data, the reception means comprising
deserialization means for deserializing the data, the deserialization means comprising
deserializer means for receiving the serial data from the channel means, and for converting the serial data to the parallel data, and
second host means for receiving the parallel data from the deserialization means.

11. The data transfer system of claim 10:
wherein the parallel data comprises a plurality of frames and a plurality of fill words; and
wherein the additional predetermined amount of the parallel data comprises one of the fill words.

12. The data transfer system of claim 10:
wherein the parallel data comprises a plurality of frames and a plurality of fill words; and
wherein the predetermined amount of the parallel data that is deleted by the buffer means comprises one of the fill words.

13. The data transfer system of claim 10:
wherein the buffer means comprises a plurality of storage cell means for storing the parallel data received by the buffer means;
wherein the total number of the storage cell means in the buffer means is 11;
wherein the first threshold is 3; and
wherein the second threshold is 6 or 8.

14. The data transfer system of claim 10:
wherein the buffer means comprises a plurality of storage cell means for storing the parallel data received by the buffer means;
wherein the total number of the storage cell means in the buffer means is 11;
wherein the first threshold is 3; and
wherein the second threshold is 10.

15. The data transfer system of claim 10, wherein the serializer means transmits the serial data to the channel at a rate greater than or equal to 4 Gbps.

16. A storage area network (SAN) comprising the data transfer system of claim 10.

17. A data transceiver comprising:
a host adapted to receive first parallel data, and to transmit second parallel data and a first clock signal; and
a serializer/deserializer (SERDES) comprising
a deserialization unit comprising
a deserializer adapted to receive first serial data from a channel, and to convert the first serial data to the first parallel data, and
a serialization unit comprising
a buffer adapted to receive the second parallel data according to the first clock signal, and to transmit the second parallel data according to a second clock signal, wherein the buffer comprises a plurality of storage cells adapted to store the second parallel data received by the buffer,
a buffer controller adapted to cause the buffer to transmit an additional predetermined amount of the second parallel data when a number of the storage cells storing the second parallel data received by the buffer but not yet transmitted by the buffer is less than or equal to a first threshold;
wherein the buffer controller is further adapted to cause the buffer to delete a predetermined amount of the second parallel data when a number of the storage cells storing the second parallel data received by the buffer but not yet transmitted by the buffer is greater than or equal to a second threshold, and
a serializer adapted to convert the second parallel data transmitted by the buffer to second serial data, and to transmit the second serial data to the channel according to the second clock signal, wherein the first and second clock signals are independent.

18. The data transceiver of claim 17:

wherein the second parallel data comprises a plurality of frames and a plurality of fill words; and wherein the additional predetermined amount of the second parallel data comprises one of the fill words.

19. The data transceiver of claim 17:

wherein the second parallel data comprises a plurality of frames and a plurality of fill words; and wherein the predetermined amount of the second parallel data that is deleted by the buffer comprises one of the fill words.

20. The data transceiver of claim 17:

wherein the buffer comprises a plurality of storage cells adapted to store the second parallel data received by the buffer;

wherein the total number of the storage cells in the buffer is 11;

wherein the first threshold is 3; and wherein the second threshold is 6 or 8.

21. The data transceiver of claim 17:

wherein the buffer comprises a plurality of storage cells adapted to store the second parallel data received by the buffer;

wherein the total number of the storage cells in the buffer is 11;

wherein the first threshold is 3; and wherein the second threshold is 10.

22. The data transceiver of claim 17, wherein the buffer is a first-in first-out (FIFO) buffer.

23. The data transceiver of claim 17, wherein the channel comprises a fibre channel.

24. The data transceiver system of claim 17, wherein the serializer is further adapted to transmit the serial data to the channel at a rate greater than or equal to 4 Gbps.

25. A storage area network (SAN) comprising the data transceiver of claim 17.

26. A data transceiver comprising:

host means for receiving first parallel data, and for transmitting second parallel data and a first clock signal; and serializer/deserializer (SERDES) means for serializing and deserializing the data, the SERDES means comprising deserialization means for deserializing the data, the deserialization means comprising deserializer means for receiving first serial data from a channel, and for converting the first serial data to the first parallel data, and serialization means for serializing the data, the serialization means comprising buffer means for receiving the second parallel data according to the first clock signal, and for transmitting the second parallel data according to a second clock signal, wherein the buffer means comprises a plurality of storage cell means for storing the second parallel data received by the buffer means, buffer controller means for causing the buffer means to transmit an additional predetermined amount of the second parallel data when a number of the storage cell means storing the second parallel data received by the buffer means but not yet transmitted by the buffer means is less than or equal to a first threshold;

wherein the buffer controller means causes the buffer means to delete a predetermined amount of the second parallel data when a number of the storage cell means storing the second parallel data received by the buffer means but not yet transmitted by the buffer means is greater than or equal to a second threshold, and serializer means for converting the second parallel data transmitted by the buffer means to second serial data, and for transmitting the second serial data to the channel according to the second clock signal, wherein the first and second clock signals are independent.

27. The data transceiver of claim 26:

wherein the second parallel data comprises a plurality of frames and a plurality of fill words; and wherein the additional predetermined amount of the second parallel data comprises one of the fill words.

28. The data transceiver of claim 26:

wherein the second parallel data comprises a plurality of frames and a plurality of fill words; and wherein the predetermined amount of the second parallel data that is deleted by the buffer means comprises one of the fill words.

29. The data transceiver of claim 26:

wherein the buffer means comprises a plurality of storage cell means for storing the second parallel data received by the buffer means;

wherein the total number of the storage cell means in the buffer means is 11;

wherein the first threshold is 3; and wherein the second threshold is 6 or 8.

30. The data transceiver of claim 26:

wherein the buffer means comprises a plurality of storage cell means for storing the second parallel data received by the buffer means;

wherein the total number of the storage cell means in the buffer means is 11;

wherein the first threshold is 3; and wherein the second threshold is 10.

31. The data transceiver of claim 26, wherein the serializer means transmits the serial data to the channel at a rate greater than or equal to 4 Gbps.

32. A storage area network (SAN) comprising the data transceiver of claim 26.

33. A serializer/deserializer (SERDES) comprising:

a deserialization unit comprising a deserializer adapted to receive first serial data from a channel, and to convert the first serial data to first parallel data; and a serialization unit comprising a buffer adapted to receive second parallel data according to a first clock signal, and to transmit the second parallel data according to a second clock signal, wherein the buffer comprises a plurality of storage cells adapted to store the second parallel data received by the buffer, a buffer controller adapted to cause the buffer to transmit an additional predetermined amount of the second parallel data when a number of the storage cells storing the second parallel data received by the buffer but not yet transmitted by the buffer is less than or equal to a first threshold, wherein the buffer controller is further adapted to cause the buffer to delete a predetermined amount of the second words of the digital data when a number of the storage cells storing the second parallel digital data received by the buffer but not yet transmitted by the buffer is greater than or equal to a second threshold, and a serializer adapted to convert the second parallel data transmitted by the buffer to second serial data, and to transmit the second serial data to the channel according to the second clock signal;

wherein the first and second clock signals are independent.

34. The SERDES of claim 33:
wherein the second parallel data comprises a plurality of frames and a plurality of fill words; and
wherein the additional predetermined amount of the second parallel data comprises one of the fill words.

35. The SERDES of claim 33:
wherein the second parallel data comprises a plurality of frames and a plurality of fill words; and
wherein the predetermined amount of the second parallel data that is deleted by the buffer comprises one of the fill words.

36. The SERDES of claim 33:
wherein the buffer comprises a plurality of storage cells adapted to store the second parallel data received by the buffer;
wherein the total number of the storage cells in the buffer is 11;
wherein the first threshold is 3; and
wherein the second threshold is 6 or 8.

37. The SERDES of claim 33:
wherein the buffer comprises a plurality of storage cells adapted to store the second parallel data received by the buffer;
wherein the total number of the storage cells in the buffer is 11;
wherein the first threshold is 3; and
wherein the second threshold is 10.

38. The SERDES of claim 33, wherein the buffer is a first-in first-out (FIFO) buffer.

39. The SERDES of claim 33, wherein the channel comprises a fibre channel.

40. The SERDES of claim 33, wherein the serializer is further adapted to transmit the serial data to the channel at a rate greater than or equal to 4 Gbps.

41. A storage area network (SAN) comprising the SERDES of claim 33.

42. A serializer/deserializer (SERDES) comprising:
deserialization means for deserializing data, the deserialization means comprising
deserializer means for receiving first serial data from a channel, and for converting the first serial data to first parallel data; and
serialization means for serializing the digital data, the serialization means comprising
buffer means for receiving second parallel data according to a first clock signal, and for transmitting the second parallel data according to a second clock signal, wherein the buffer means comprises a plurality of storage cell means for storing the second parallel data received by the buffer means,
buffer controller means for causing the buffer means to transmit an additional predetermined amount of the second parallel data when a number of the storage cell means storing the second parallel data received by the buffer means but not yet transmitted by the buffer means is less than or equal to a first threshold, wherein the buffer controller means causes the buffer means to delete a predetermined amount of the second parallel data when a number of the storage cell means storing the second parallel data received by the buffer means but not yet transmitted by the buffer means is greater than or equal to a second threshold, and serializer means for converting the second parallel data transmitted by the buffer means to second serial data, and for transmitting the second serial data to the channel according to the second clock signal;

wherein the first and second clock signals are independent.

43. The SERDES of claim 42:
wherein the second parallel data comprises a plurality of frames and a plurality of fill words; and
wherein the additional predetermined amount of the second parallel data comprises one of the fill words.

44. The SERDES of claim 42:
wherein the second parallel data comprises a plurality of frames and a plurality of fill words; and
wherein the predetermined amount of the second parallel data that is deleted by the buffer means comprises one of the fill words.

45. The SERDES of claim 42:
wherein the buffer means comprises a plurality of storage cell means for storing the second parallel data received by the buffer means;
wherein the total number of the storage cell means in the buffer means is 11;
wherein the first threshold is 3; and
wherein the second threshold is 6 or 8.

46. The SERDES of claim 42:
wherein the buffer means comprises a plurality of storage cell means for storing the second parallel data received by the buffer means;
wherein the total number of the storage cell means in the buffer means is 11;
wherein the first threshold is 3; and
wherein the second threshold is 10.

47. The SERDES of claim 42, wherein the serializer means transmits the serial data to the channel at a rate greater than or equal to 4 Gbps.

48. A storage area network (SAN) comprising the SERDES of claim 42.

49. An apparatus comprising:
a buffer adapted to receive parallel data according to a first clock signal, and to transmit the parallel data according to a second clock signal, wherein the buffer comprises a plurality of storage cells adapted to store the parallel data received by the buffer;
a buffer controller adapted to cause the buffer to transmit an additional predetermined amount of the parallel data when a number of the storage cells storing the parallel data received by the buffer but not yet transmitted by the buffer is less than or equal to a first threshold;
wherein the buffer controller is further adapted to cause the buffer to delete a predetermined amount of the parallel data when a number of the storage cells storing the parallel data received by the buffer but not yet transmitted by the buffer is greater than or equal to a second threshold; and
a serializer adapted to convert the parallel data transmitted by the buffer to serial data, and to transmit the serial data according to the second clock signal;
wherein the first and second clock signals are independent.

50. The apparatus of claim 49:
wherein the parallel data comprises a plurality of frames and a plurality of fill words; and
wherein the additional predetermined amount of the parallel data comprises one of the fill words.

51. The apparatus of claim 49:
wherein the parallel data comprises a plurality of frames and a plurality of fill words; and
wherein the predetermined amount of the parallel data that is deleted by the buffer comprises one of the fill words.

52. The apparatus of claim 49:
wherein the total number of the storage cells in the buffer is 11;
wherein the first threshold is 3; and
wherein the second threshold is 6 or 8.

53. The apparatus of claim 49:
wherein the total number of the storage cells in the buffer is 11;
wherein the first threshold is 3; and
wherein the second threshold is 10.

54. The apparatus of claim 49, wherein the buffer is a first-in first-out (FIFO) buffer.

55. The apparatus of claim 49, wherein the serializer transmits the serial data to a fibre channel.

56. The apparatus of claim 49, wherein the serializer is further adapted to transmit the serial data to the channel at a rate greater than or equal to 4 Gbps.

57. A storage area network (SAN) comprising the apparatus of claim 49.

58. An apparatus comprising:
buffer means for receiving parallel data according to a first clock signal, and for transmitting the parallel data according to a second clock signal, wherein the buffer means comprises a plurality of storage cell means for storing the parallel data received by the buffer means;
buffer controller means for causing the buffer means to transmit an additional predetermined amount of the parallel data when a number of the storage cell means storing the parallel data received by the buffer means but not yet transmitted by the buffer means is less than or equal to a first threshold;
wherein the buffer controller causes the buffer means to delete a predetermined amount of the parallel data when a number of the storage cell means storing the parallel data received by the buffer means but not yet transmitted by the buffer means is greater than or equal to a second threshold; and
serializer means for converting the parallel data transmitted by the buffer means to serial data, and for transmitting the serial data according to the second clock signal;
wherein the first and second clock signals are independent.

59. The apparatus of claim 58:
wherein the parallel data comprises a plurality of frames and a plurality of fill words; and
wherein the additional predetermined amount of the parallel data comprises one of the fill words.

60. The apparatus of claim 58:
wherein the parallel data comprises a plurality of frames and a plurality of fill words; and
wherein the predetermined amount of the parallel data that is deleted by the buffer means comprises one of the fill words.

61. The apparatus of claim 58:
wherein the total number of the storage cell means in the buffer means is 11;
wherein the first threshold is 3; and
wherein the second threshold is 6 or 8.

62. The apparatus of claim 58:
wherein the total number of the storage cell means in the buffer means is 11;
wherein the first threshold is 3; and
wherein the second threshold is 10.

63. The apparatus of claim 58, wherein the serializer means transmits the serial data to the channel at a rate greater than or equal to 4 Gbps.

64. A storage area network (SAN) comprising the apparatus of claim 58.

65. A method comprising:
storing parallel data according to a first clock signal;
retrieving the parallel data according to a second clock signal;
converting the retrieved parallel data to serial data;
transmitting the serial data according to the second clock signal;
wherein the first and second clock signals are independent;
transmitting an additional predetermined amount of the parallel data when a number of storage cells storing the parallel data stored but not yet retrieved is less than or equal to a first threshold; and
deleting a predetermined amount of the parallel data when a number of the storage cells storing the parallel data stored but not yet retrieved is greater than or equal to a second threshold.

66. The method of claim 65:
wherein the parallel data comprises a plurality of frames and a plurality of fill words; and
wherein the additional predetermined amount of the parallel data comprises one of the fill words.

67. The method of claim 65:
wherein the parallel data comprises a plurality of frames and a plurality of fill words; and
wherein the predetermined amount of the parallel data that is deleted comprises one of the fill words.

68. The method of claim 65:
wherein the total number of the storage cells available to store the parallel data is 11;
wherein the first threshold is 3; and
wherein the second threshold is 6 or 8.

69. The method of claim 65:
wherein the total number of the storage cells available to store the parallel data is 11;
wherein the first threshold is 3; and
wherein the second threshold is 10.

70. The method of claim 65, wherein the serial data is transmitted to a fibre channel.

71. The method of claim 65, wherein the serial data is transmitted at a rate greater than or equal to 4 Gbps.

72. A computer readable storage medium that stores a computer program embodying instructions executable by a computer to perform a method, said instructions comprising:
storing parallel data according to a first clock signal;
retrieving the parallel data according to a second clock signal;
converting the retrieved parallel data to serial data; and
transmitting the serial data according to the second clock signal;
wherein the first and second clock signals are independent;

transmitting an additional predetermined amount of the parallel data when a number of storage cells storing the parallel data stored but not yet retrieved is less than or equal to a first threshold; and deleting a predetermined amount of the parallel data when a number of the storage cells storing the parallel data stored but not yet retrieved is greater than or equal to a second threshold.

73. The computer readable storage medium of claim 72:
wherein the parallel data comprises a plurality of frames and a plurality of fill words; and
wherein the additional predetermined amount of the parallel data comprises one of the fill words.

74. The computer readable storage medium of claim 72:
wherein the parallel data comprises a plurality of frames and a plurality of fill words; and
wherein the predetermined amount of the parallel data that is deleted comprises one of the fill words.

75. The computer readable storage medium of claim 72:
wherein the total number of the storage cells available to store the parallel data is 11;
wherein the first threshold is 3; and
wherein the second threshold is 6 or 8.

76. The computer readable storage medium of claim 72:
wherein the total number of the storage cells available to store the parallel data is 11;
wherein the first threshold is 3; and
wherein the second threshold is 10.

77. The computer readable storage medium of claim 72, wherein the serial digital data is transmitted to a fibre channel.

78. The computer readable storage medium of claim 72, wherein the serial data is transmitted at a rate greater than or equal to 4 Gbps.

* * * * *

UNITED STATES PATENT AND TRADEMARK OFFICE
CERTIFICATE OF CORRECTION

PATENT NO. : 7,321,593 B1 Page 1 of 1
APPLICATION NO. : 10/621297
DATED : January 22, 2008
INVENTOR(S) : Hong Wei Feng It is certified that error appears in the above-identified patent and that said Letters Patent is hereby corrected as shown below:

Column 2, Line 29   Delete "." after "threshold"
Column 6, Line 44   Delete "RDY" and insert -- R_RDY --

Signed and Sealed this

Tenth Day of June, 2008

JON W. DUDAS
*Director of the United States Patent and Trademark Office*